June 24, 1958  N. GREENE  2,840,124
REUSEABLE DISPENSING COVER
Filed July 13, 1953
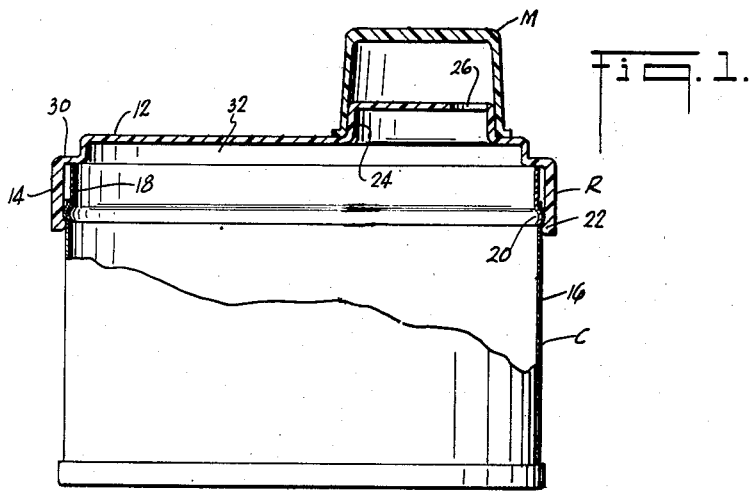
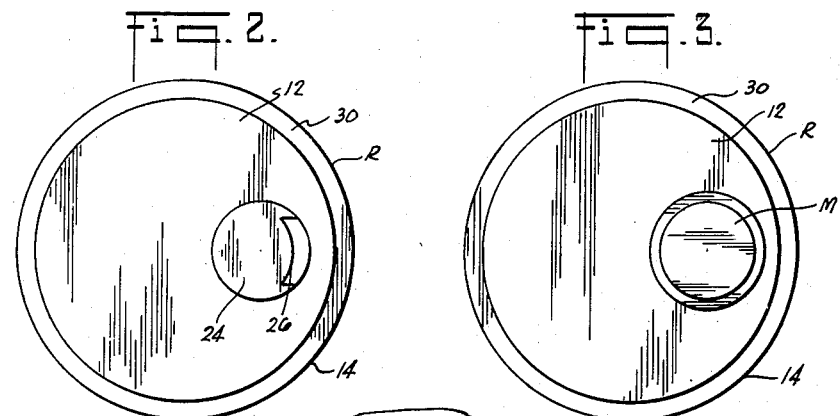
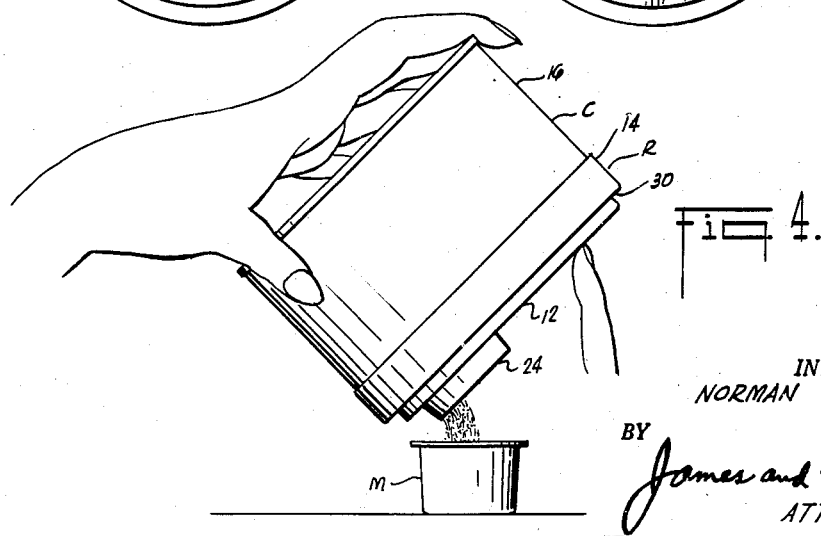
INVENTOR.
NORMAN GREENE
BY
James and Franklin
ATTORNEYS

United States Patent Office 2,840,124
Patented June 24, 1958

2,840,124
REUSEABLE DISPENSING COVER

Norman Greene, New York, N. Y.

Application July 13, 1953, Serial No. 367,460

4 Claims. (Cl. 141—381)

This invention relates to reuseable covers, especially dispensing covers, and more particularly to a cover for cans such as vacuum sealed coffee cans.

The typical vacuum sealed coffee can in use today has a cylindrical outside wall sealed to end caps, but with score lines near the top providing a tear strip which may be wound on a suitable key to open the can. An inner ring or supporting ring is provided near the top of the can to receive the residual cover which remains after removing the tear strip. However, this does not provide a satisfactory cover because it is relatively loose and does not seal the contents. It usually has a sharp or rough edge. It is difficult to start removal of coffee from a new can because it is filled flush with the top edge and sometimes may pack rather tightly. Accidental dropping of the can may result in spilling of the entire contents because the cover is loose enough to readily fall off.

The general object of the present invention is to overcome the foregoing difficulties, which I do by providing a reusable cover molded out of a flexible plastic, and so dimensioned as to adhere tightly to the outside wall of the coffee can beneath the original location of the tear strip. The cover may be held by friction, or, more preferably, is provided with a slight undercut which mates with the peripheral bead on the outside of the coffee can beneath the tear strip, thus anchoring the cover tightly on the can, and also sealing the contents of the can.

A further object of the invention is to facilitate pouring or dispensing of coffee from the can, and for this purpose the holded cover is provided with a boss, preferably located near one edge of the cover. The said boss has a pour hole and thus acts as a dispensing spout. The pour hole is preferably made relatively small for easy control of the flow of the contents from the can. The boss is itself closed by a suitable cap, and this may be secured to the boss in desired fashion, preferably frictionally. In accordance with a further feature and object of the invention, the cap itself is preferably dimensioned to act also as a measuring unit for the contents, typical to measure the amount of coffee needed per cup.

Still another object of the invention is to facilitate the initial flow of the material when the can is freshly opened and full; and also to control the flow of material when the container is partially empty. For this purpose the top wall is preferably shouldered and stepped upwardly within the circumference thereof, thus providing room for material to flow even when the container is full. Moreover, the raised wall is preferably made thinner than the side wall, or in any event thin enough so that one may tap the same to act as a flexible diaphragm, thereby producing a controlled flow of the coffee or other material through the pour hole.

The entire cover, except for the measuring cap, is preferably made of a single integrally molded piece of a flexible plastic. The plastic is preferably polyethylene or polyisobutylene, or a mixture of the two. This material has the advantage of not reacting with food products, drug products, etc. It is flexible and somewhat adherent so that a frictional fit with a relatively good seal may be obtained. However, the reuseable cover may be made of other materials, such as rubber, cellulose acetate, and many of the other known plastics.

To accomplish the foregoing general objects, and other more specific objects which will hereinafter appear, my invention resides in the reuseable dispensing cover elements, and their relation one to another, as are hereinafter more particularly described in the following specification. The specification is accompanied by a drawing in which:

Fig. 1 is a partially sectioned elevation of a conventional coffee can with my reuseable dispensing cover applied thereto;

Fig. 2 is a plan view of the cover with the cap removed;

Fig. 3 is a similar view with the cap applied; and

Fig. 4 shows the invention in use.

Referring to the drawing, the container C is here shown as a sheet metal coffee can, the tear strip and the metal cap of which have already been removed. The reuseable molded cover R of my invention has been applied to the can, the latter being sealed by the cover R and its cap M applied thereto.

Considering the arrangement in greater detail, the reuseable cover R comprises a top wall 12 and a side wall 14, the latter being so dimensioned as to fit snugly around the top of the open container. In accordance with conventional practice the main side wall 16 of the container, in this case a coffee can, is supplemented by an inner supporting ring 18, which is secured to the side wall 16 as by means of an outwardly struck bead 20. The inner ring 18 retains the upper level of coffee after the tear strip and cap have been removed, and serves as a support to receive the removable metal cap which is formed by rolling away the tear strip. However, inasmuch as the skirt or side wall of the metal cap is very short in axial dimension, and is strained outward during the removal of the tear strip, the fit of this metal cap is comparatively loose and unsatisfactory. In contrast, the side wall 14 of my reuseable cover is sturdy and deep in axial direction, so that it comes down beyond the bead 20, and engages the original outer side wall 16 of the can, thus providing a rather snug sealing action which helps protect and retain the flavor and aroma of the coffee. The side wall 14 is preferably provided with a bead or undercut 22, and this mates with the bead 20, thus more securely anchoring the cover on the can.

The top wall 12 of the cover is provided with a preferably circular raised boss 24 having a pour hole 26. The cap M is received over the boss 24 and thus closes the pour hole. This cap is preferably dimensioned to act as a measuring cup to measure predetermined units of the material. Typically, it is dimensioned to measure the amount of coffee to be used per cup.

The manner in which this can be done is clearly shown in Fig. 4. In Figs. 1 and 2 it will be noted that the pour hole 26 is rather small in area compared to the area of the boss 24, and this helps control the flow of coffee. It will also be noted that the hole 26 is located at the edge of the boss, which in turn is offset from the center of the can and located near one edge thereof, thus making it easier to flow the coffee from the can into the cup without waste.

The cap M may be secured to the boss 24 in any desired fashion, as by means of a continuous screw thread, short pieces of interrupted thread, or a ring and undercut for a snap fit, but in the present case the fit is simply a frictional one. The boss and the cap are both slightly tapered, and they are so dimensioned that the cap fits rather tightly over the boss. The plastic material is somewhat adherent, particularly when both surfaces are polyethylene, polyisobutylene, or a mixture of both; and are in snug engagement with one another, and I have found that a simple frictional fit is adequate for the present purpose, and secures the cap to the boss safely and with a good air tight seal.

In Fig. 1 it will be noted that the top wall of the cover is shouldered at 30 and stepped upwardly. This provides a space in the region 32 above the coffee, even when dealing with a freshly opened and tightly packed can. The space 32 makes it easier for an initial flow of coffee to start toward the pouring hole.

Moreover, it will be observed that the top wall 12 is thinner than the side wall 14, and it is preferably thin enough to be easily deflected inward with a kind of diaphragm action. This is of value even after the can has been partly emptied, for by pressing the top wall 12 with one's finger, as shown in Fig. 4, the resulting movement helps start a flow of coffee from the can, and the vigor and frequency of tapping may be used to control the rate of flow.

It will be understood that when a can of coffee has been consumed, the cover with its measuring cap is removed from the empty can and applied to a newly opened can. Thus the cover may be reused indefinitely.

It is believed that the construction and method of use of my improved reuseable dispensing cover, as well as the advantages thereof, will be aparent from the foregoing detailed description. It will be understood that I have described the invention applied to vacuum sealed coffee cans, in order to illustrate a most common and important contemplated use, but the invention is equally well adaptable to cans containing other materials, particularly those of a dry powdered, granular, flake-like, or fibrous nature. It will also be apparent that while I have shown and described my invention in a preferred form, changes may be made in the structure shown without departing from the scope of the invention, as sought to be defined in the following claims.

I claim:

1. A reuseable dispensing cover for a vacuum sealed can of the type commonly used for vacuum packed coffee, said can being rigid and having a diameter which is large relative to its height and being open entirely across its top, said cover comprising top and side walls with the side wall so dimensioned as to fit snugly but removably around the top of the open can, the top wall of said cover being provided near its edge with a raised approximately cylindrical boss having a single large pour hole, a cap removably received over said boss to close the same, and the top wall of said cover being shouldered and stepped upwardly within the circumference thereof, to provide a hollow space above the contents of the can even when the can is level full, said cover being made of a single integrally molded piece of a flexible plastic having the physical characteristics of polyethylene and polyisobutylene and mixtures of the two.

2. A reuseable dispensing cover for a vacuum sealed can of the type commonly used for vacuum packed coffee, said can being rigid and having a diameter which is large relative to its height and being open entirely across its top, said cover comprising top and side walls with the side wall so dimensioned as to fit snugly but removably around the top of the open can, the inside of said side wall having a bead or undercut dimensioned to engage a circumferential bead of the can with a snap fit, the top wall of said cover being provided in offset position near its edge with a raised approximately cylindrical boss having a single pour hole, said boss having a diameter substantially greater than its height, and a cap removably received over said boss to close the same, said cap being dimensioned to act as a measuring cup to measure predetermined units of the coffee being dispensed through the pour hole, said pour hole being near that edge of the boss which is near the adjacent edge of the cover, and the top wall of said cover being shouldered and stepped upwardly within the circumference thereof and being thinner than the side wall in order to facilitate movement to produce a controlled flow of the coffee through the pour hole, said cover being made of a single integrally molded piece of flexible plastic.

3. A reuseable dispensing cover for a vacuum sealed can of the type commonly used for vacuum packed coffee, said can being rigid and having a diameter which is large relative to its height and being open entirely across its top, said cover comprising top and side walls with the side wall so dimensioned as to fit snugly but removably around the top of the open can, the top wall of said cover being provided near its edge with a raised approximately cylindrical boss having a single large pour hole, a cap removably received over said boss to close the same, and the top wall of said cover being shouldered and stepped upwardly within the circumference thereof, to provide a hollow space above the contents of the can even when the can is level full, said cover being made of a single integrally molded piece of a flexible plastic.

4. A reuseable dispensing cover for a vacuum sealed can of the type commonly used for vacuum packed coffee, said can being rigid and having a diameter which is large relative to its height and being open entirely across its top, said cover comprising top and side walls with the side wall so dimensioned as to fit snugly but removably around the top of the open can, the top wall of said cover being provided near its edge with a raised approximately cylindrical boss having a single large pour hole, a cap removably received over said boss to close the same, said cap being dimensioned to act as a measuring cup to measure predetermined units of the coffee being dispensed through the pour hole, and the top wall of said cover being shouldered and stepped upwardly within the circumference thereof, to provide a hollow space above the contents of the can even when the can is level full, said cover being made of a single integrally molded piece of a flexible plastic.

References Cited in the file of this patent

UNITED STATES PATENTS

| | | |
|---|---|---|
| 222,780 | Griffin | Dec. 23, 1879 |
| 525,753 | Turner | Sept. 11, 1894 |
| 1,281,472 | Wooten | Oct. 15, 1918 |
| 1,773,263 | Dister | Aug. 19, 1930 |
| 1,922,967 | Mandabach | Aug. 15, 1933 |
| 2,031,006 | Rollason | Feb. 18, 1936 |
| 2,543,850 | Henricson | Mar. 6, 1951 |
| 2,545,350 | Fuld | Mar. 13, 1951 |
| 2,623,660 | Warren | Dec. 30, 1952 |
| 2,753,051 | Tupper | July 3, 1956 |